(12) United States Patent
Kirchmair et al.

(10) Patent No.: US 11,338,870 B2
(45) Date of Patent: May 24, 2022

(54) BELT FOR TRACKED VEHICLES

(71) Applicant: PRINOTH S.P.A., Vipiteno (IT)

(72) Inventors: Martin Kirchmair, Pfons (AT);
Gregor Maurer, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 640 days.

(21) Appl. No.: 16/310,707

(22) PCT Filed: Jun. 30, 2017

(86) PCT No.: PCT/IB2017/053980
§ 371 (c)(1),
(2) Date: Dec. 17, 2018

(87) PCT Pub. No.: WO2018/002903
PCT Pub. Date: Jan. 4, 2018

(65) Prior Publication Data
US 2019/0161133 A1 May 30, 2019

(30) Foreign Application Priority Data

Jul. 1, 2016 (IT) .......................... 102016000068841

(51) Int. Cl.
*B62D 55/24* (2006.01)
*B62D 55/28* (2006.01)
(Continued)

(52) U.S. Cl.
CPC ............ *B62D 55/244* (2013.01); *B32B 5/024* (2013.01); *B32B 5/08* (2013.01); *B62D 55/24* (2013.01);
(Continued)

(58) Field of Classification Search
CPC ............ B32B 2262/0269; B32B 5/024; B32B 2262/0276; B32B 5/08; B62D 55/253; B62D 55/244; B62D 55/24
See application file for complete search history.

(56) References Cited

U.S. PATENT DOCUMENTS 3,464,743 A 9/1969 Hallaman
5,354,124 A 10/1994 James
(Continued)

FOREIGN PATENT DOCUMENTS

CN 2825409 Y 10/2006
CN 202054069 U 11/2011
(Continued)

OTHER PUBLICATIONS

Notification Concerning Submission, Obtention or Transmittal of Priority Document for International Application No. PCT/IB2017/053980 dated Oct. 6, 2017.
(Continued)

*Primary Examiner* — Vishal I Patel
(74) *Attorney, Agent, or Firm* — Neal, Gerber & Eisenberg LLP

(57) ABSTRACT

A belt for tracked vehicles suitable for being driven in a closed loop between a front wheel and a rear wheel of the vehicle along a longitudinal direction and for supporting a plurality of transverse bars adapted to stick in the ground along at least a portion of the lower run of the belt loop; the belt comprising a fabric multi-layer internal structure embedded in vulcanized rubber, wherein at least a portion of the fabric fiber of at least one layer is made of aramid.

10 Claims, 2 Drawing Sheets

(51) Int. Cl.
*B32B 5/02* (2006.01)
*B32B 5/08* (2006.01)
*B62D 55/253* (2006.01)

(52) U.S. Cl.
CPC ......... *B62D 55/253* (2013.01); *B62D 55/286* (2013.01); *B32B 2262/0269* (2013.01); *B32B 2262/0276* (2013.01)

(56) References Cited

U.S. PATENT DOCUMENTS

| | | | |
|---|---|---|---|
| 5,533,796 A | 7/1996 | Beeley | |
| 10,953,937 B2 * | 3/2021 | Laplante | ............. B62D 55/244 |

FOREIGN PATENT DOCUMENTS

| | | | | |
|---|---|---|---|---|
| CN | 202911833 U | 5/2013 | | |
| CN | 104192218 A | 12/2014 | | |
| DE | 1904507 | 6/1970 | | |
| DE | 3530686 | 3/1987 | | |
| EP | 0 263 310 | 4/1988 | | |
| EP | 1 792 811 | 6/2007 | | |
| WO | WO 2004/033276 | 4/2004 | | |
| WO | WO-2004033276 A1 * | 4/2004 | ............. | B62D 55/24 |

OTHER PUBLICATIONS

International Search Report and Written Opinion for International Application No. PCT/IB2017/053980 dated Oct. 18, 2017.
Chinese Office Action (with translation) and Search Report for Application No. 201780002822.5 dated Oct. 12, 2020 (13 pages).

* cited by examiner

FIG.1
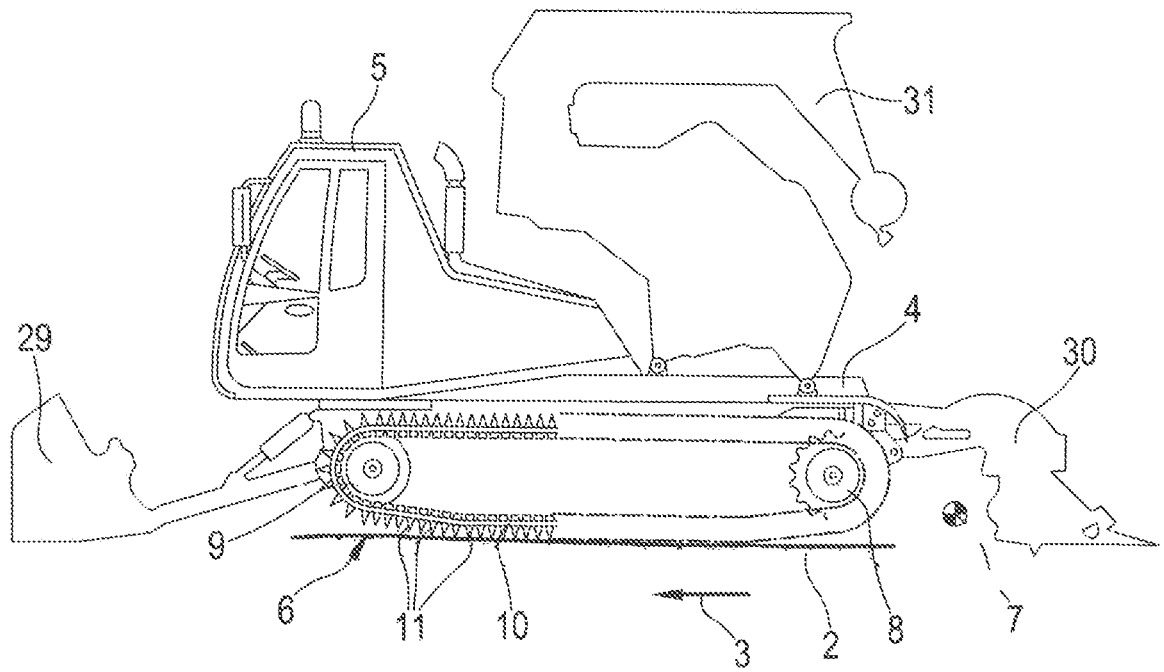
FIG.2
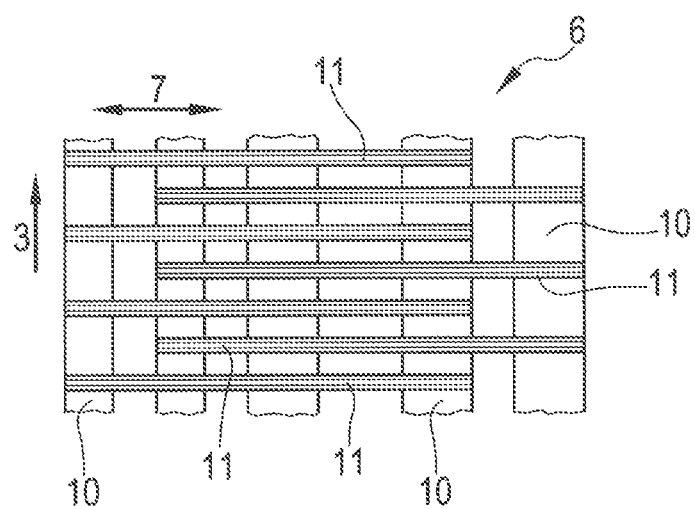
FIG.3

BELT FOR TRACKED VEHICLES

PRIORITY CLAIM

This application is a national stage application of PCT/IB2017/053980, filed on Jun. 30, 2017, which claims the benefit of and priority to Italian Patent Application No. 102016000068841, filed on Jul. 1, 2016, the entire contents of which are each incorporated by reference herein.

TECHNICAL FIELD

The present disclosure relates to a belt for tracked vehicles. In particular, the present disclosure relates to a belt for snow groomer vehicles or, in general, for a tracked vehicle for the preparation of ski runs.

BACKGROUND

In the ski-run preparation sector, it is known to use tracked vehicles, known as groomers, comprising a support frame and a driver's cabin mounted centrally on the support frame.

The snow groomer vehicle is also equipped with a plurality of work units such as, for example, a tiller configured to work the snow cover of the ski runs, a shovel configured to move snow masses along the ski runs and/or a winch unit configured to ensure stability of the snow groomer vehicle on relatively steep slopes and to prevent the snow groomer vehicle from sliding in the event of losing grip on the snow cover.

Forward movement of the tracked vehicle takes place by two tracks mounted on opposite sides of the support frame.

Each track comprises a front wheel, a rear wheel and a plurality of belts arranged parallel to each other and in a loop around the front and rear wheels. The longitudinal direction of the belts is defined by their movement between the wheels.

In some tracked vehicles, each track comprises a single belt that occupies the entire transverse direction of the respective track.

Each track also comprises a plurality of spaced out transverse bars fastened on the outer face of the belts and parallel to each other along the direction transverse to the belt's direction of travel. The outer face of the belt means the surface that, during the travel of the lower run of the belt loop between the wheels, is facing the ground, or the snow if present, in such a way that the bars can grip the ground, or snow cover of the ski run, acting like cleats.

The rear wheel is usually a drive wheel and, for this reason, has sprockets that engage the spaces between the transverse bars, or between the links of chain, if present. Rotational motion is transmitted to the drive wheel by an engine, such as an internal combustion engine, housed in the chassis of the tracked vehicle.

Tracked vehicles are usually also equipped with support wheels arranged between the rear wheel and the front wheel in order to keep the traction portion of the belt in contact with the ground and distribute the mass of the tracked vehicle along this traction portion.

The transverse bars can extend transversely for the entire transverse width of the track, thus coupling with all the belts, or can have an extension smaller that the transverse width of the track so as only couple with some belts. In this last case, the transverse bars can follow one another in a staggered manner along the longitudinal direction of the belts.

Each transverse bar thus performs the function of a cleat and usually comprises a steel, aluminium or aluminium alloy section bar, having a substantially triangular shape.

Each transverse bar also has an inner cavity that extends through the section bar transversely to the belt's direction of travel and is open at the sides in correspondence to its free ends.

Normally, the device fastening the transverse bar to the belt comprises an inner plate inserted inside the section bar's cavity and an outer plate arranged in contact with the belt on the opposite side with respect to the section bar.

The inner plate may only extend along a single belt or, like the transverse bars, can have a transverse length such that the inner plate can be coupled to more than one belt.

The ensemble defined by the inner and outer plates, the belt and the transverse bar is locked or packed together via a plurality of clamping screws passing through aligned holes made in the plates, in the belt, and in the section bar. Bolts, rivets, or equivalent rod-like locking devices can be used instead of screws.

The belts are usually made of vulcanized rubber inside which at least three superimposed layers of interwoven fabric fibers have been embedded.

Each layer comprises fabric fibers oriented both in the longitudinal direction parallel to the direction of movement of the belt and in the transverse direction. These interwoven fabric fibers thus create a warp/weft coupling in each layer of the belt where the longitudinal fibers, or warp, are destined to provide the necessary tensile strength for the belt, while the transverse fibers, or weft, provide dimensional stability to the belt, preventing lateral disintegration or stretching in that direction.

As indicated above, the transverse bar sticks in the ground, or snow, during the movement of the track to give the tracked vehicle greater tractive grip. However, this greater grip and the tractive force discharge onto the belts in correspondence to the screws that connect the bars to the associated belts. The screws subjected to this load then bear against the inner wall of the hole in the belt in which they are housed along the belt's direction of travel. Since the reinforcing fibers embedded in the rubber are necessarily cut at the walls of the hole, local strength is less than that of the rest of the belt. Over time, this local "weakness" results in the hole taking on an elongated or slot-like shape along the belt's direction of travel.

Ovalization of the hole implicates a series of drawbacks. A first drawback consists in the loosening of mechanical constraint that secures the transverse bar to the belt, inevitably resulting in vibration and mechanical stress that, in the long term, can also lead to losing the fastening screw or bolt.

Another drawback related to ovalization of the hole housing the screw in the belt consists in that, in this configuration, impurities or even plain water can easily penetrate into the screw's seat and work its way inside or between the fabric layers that form the belt.

In the case of a snow-grooming tracked vehicle, snow could penetrate in the elongated seat and then, turning into water, could work its way inside the weft or warp fabric forming the inner layers of the belt embedded in the vulcanized rubber. This entry of water can result in the formation of local swelling on the outer surface of the belt or detachment of the layers constituting the belt. Since snow groomer vehicles operate in areas where temperatures can drop well below zero degrees Celsius, the water penetrating into the fabric can freeze, with a naturally consequent increase in volume.

The repetition of freezing and melting cycles of water infiltrated into the belt's inner fabrics leads to the mechanical detachment of the layers of the belt.

It is therefore clear that the infiltration of snow or water into the belt's inner fabric layers has destructive effects on the track.

One currently known solution for preventing water or impurities from penetrating in the holes of the belt consists in using special sealing bushes. However, this solution has the drawback of being excessively expensive.

Another known solution generally deals with the problem of hole ovalization, with the consequent risks of losing the fastening screw of the bars or of water penetrating into the inner fabric of the belt. Specifically, one proposed solution is to provide the belt with a further outer layer in which the weft and warp fibers are not oriented longitudinally and transversely to the belt, but have an angled orientation so as form portions of uncut fibers, and therefore of greater strength, close to the hole. Another proposed solution is to provide the belt with clamping plate devices for the transverse bars configured in such a way that only a minimal part of the load is discharged onto the holes housing the fastening screws. However, both of these solutions have the drawback of requiring an increase in the bulk of the belt, with the consequent impossibility of not being able to install new "improved" belts on currently operating or standard tracked vehicles.

SUMMARY

The object of the present disclosure is to provide an alternative belt for tracked vehicles having greater resistance to the ovalization tendency of the hole housing the screw fastening the bar to the belt without, at the same time, having increased thickness or bulk.

In particular, the object of the present disclosure is to provide a belt for tracked vehicles suitable for being driven in a closed loop between a front wheel and a rear wheel of the vehicle along a longitudinal direction and configured to support a plurality of transverse bars adapted to stick in the ground along at least a portion of the lower run of the belt loop. This belt comprises a fabric multi-layer structure embedded in vulcanized rubber, which externally defines the shape and size of the belt. According to the disclosure, at least a portion of the fabric fiber of at least one layer is made of aramid.

Aramid fiber, also known by the commercial name of "Kevlar", is a synthetic fiber endowed with high mechanical tensile strength. Indicatively, aramid has a toughness equal to approximately 200 cN/tex with an extensibility approximately equal to just 3% of the initial length. Therefore, in the description below, the term aramid will refer to a synthetic fiber with the above-indicated mechanical properties. Furthermore, for the purposes of the present disclosure, a fabric fiber made of aramid means a fabric fiber comprising a percentage of aramid of between 50% and 100%.

In particular, the fabric multi-layer structure embedded in vulcanized rubber comprises, for example, at least three superimposed layers parallel to the ground, or to the face that supports the transverse bars. This fabric multi-layer structure comprises an inner layer and two outer layers arranged on opposite sides with respect to the inner layer, and where each layer comprises at least one fabric weft fiber and at least one fabric warp fiber.

In particular, the fabric warp fiber is, in certain embodiments, aligned to the belt's longitudinal direction of travel, while the weft fiber is, in certain embodiments, aligned to the transverse direction parallel to the transverse bars.

Starting from this arrangement of layers and weft and warp fibers, according to a first embodiment of the disclosure, the warp fiber of the inner layer aligned to the belt's longitudinal direction of travel is at least in part made of aramid. In this way, all the longitudinal tension in the track during movement is absorbed without danger of rupture, with a longitudinal lengthening of the belt much smaller, approximately ⅓, with respect to similar belts with longitudinal fibers made of polyester.

In particular, the inner layer is completed with a fabric weft fiber at least in part made of nylon, which can be arranged on both the opposite sides (i.e., both above and below with respect to the fabric warp fiber in aramid).

Alternatively, or rather as a second embodiment of the disclosure independent of the prior one, or in addition to the inner layer described so far, the fabric weft fiber of at least one of the outer layers perpendicular to the belt's longitudinal direction of travel is at least in part made of aramid. In certain embodiments, in these outer layers the fabric weft fibers in aramid are linked at both opposite ends of the fabric warp fiber, such as at least in part made of polyester.

It should be appreciated that the terms nylon and polyester also includes other fabrics having similar mechanical characteristics of toughness and extensibility.

This arrangement of the outer layers with a double aramid weft endows the belt with greater resistance to the elongation effect of the holes that afflicts the belts of the snow groomer.

With particular reference to this field of application of the disclosure, the snow groomer belt comprises at least one hole configured to house the fastening screw of the transverse bar and the fabric fibers in aramid are arranged at least at this hole.

The wording "at this hole" means that at least one weft or warp fiber of at least one layer made of aramid is present within an ideal circumference centred on the hole and having a radius at least twice the radius of the hole.

It should be appreciated that the wording "one weft or warp fiber" is not meant to be a single filament, but a plurality of mutually ordered and parallel filaments.

Additional features are described in, and will be apparent from the following Detailed Description and the figures.

BRIEF DESCRIPTION OF THE DRAWINGS

Further characteristics of the present disclosure will become clearer form the description that follows of a non-limitative embodiment, referring to the figures of the accompanying drawings, in which:

FIG. 1 is a schematic view of a snow-grooming tracked vehicle for application of the belt according to the present disclosure;

FIG. 2 is a top view of a portion of the tracked vehicle in FIG. 1;

FIG. 3 is a schematic view of the coupling that attaches the transverse bars to the belt.

DETAILED DESCRIPTION

Figure 4:
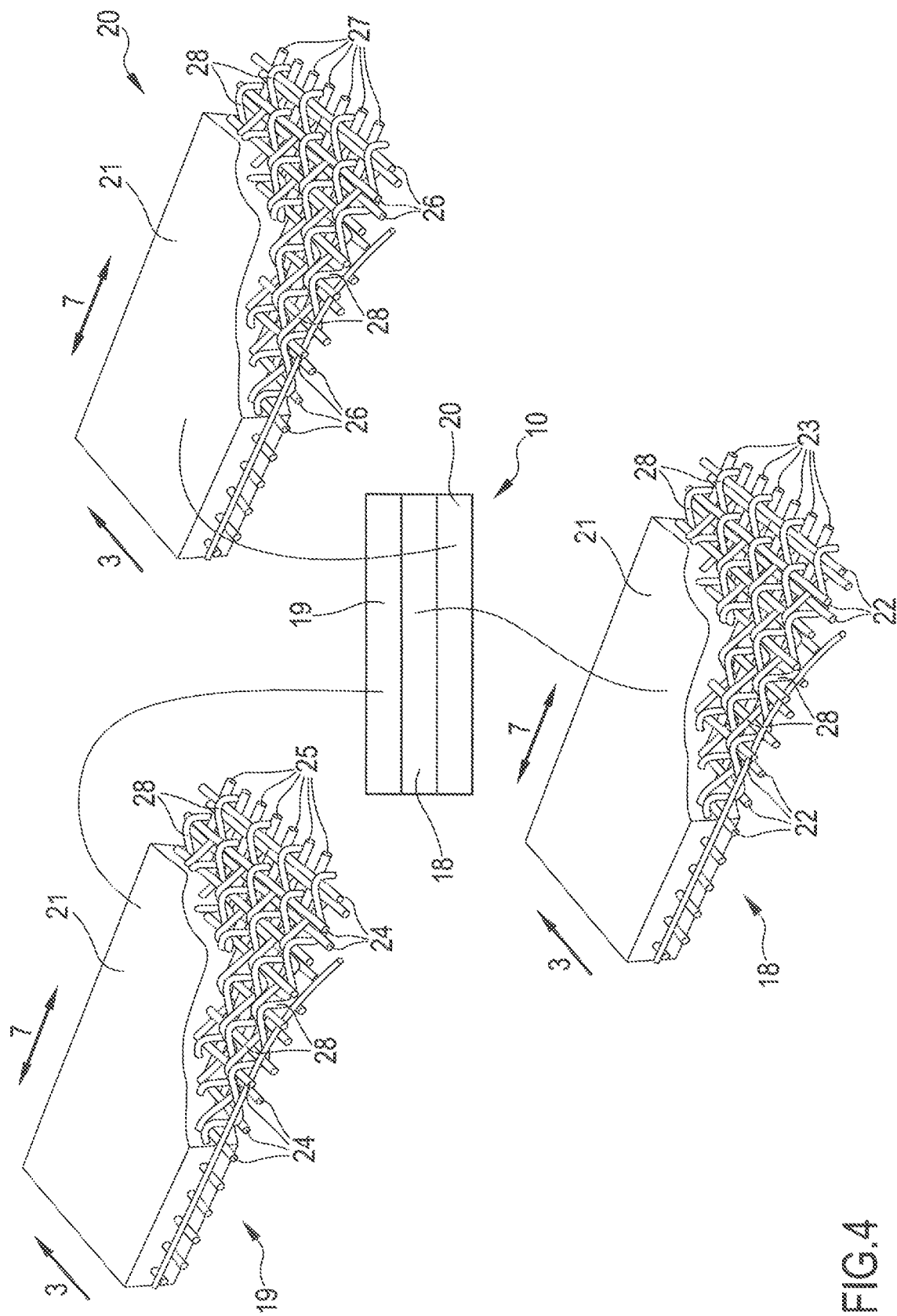
FIG. 4 schematically shows the internal structure of the belt, made by the superimposition of layers of fabric with weft and warp fibers embedded in vulcanized rubber.

Referring now to the example embodiments of the present disclosure illustrated in FIGS. 1 to 4, reference numeral 1 indicates a snow-grooming tracked vehicle as an example of a tracked vehicle on which the belt 10 forming the subject of the present disclosure can be mounted.

This snow groomer 1 is a tracked vehicle and is motorized to travel along a ski run 2 in a direction of travel 3. The snow groomer vehicle 1 is further equipped with a plurality of work units such as, for example, a tiller 30 configured to work the snow cover of the ski runs, a shovel 29 configured to move snow masses along the ski runs and/or a winch unit 31. The snow groomer 1 comprises a support frame 4, a driver's cabin 5 mounted on the support frame 4 and two tracks 6 mounted on opposite sides of the support frame 4.

Each track 6 comprises a plurality of belts 10 mounted between a front wheel 9 and a rear wheel 8, and a plurality of transverse bars 11 fastened to the belts 10.

The direction of travel of the belts 10 defines the direction that will be indicated in the remaining description as the longitudinal direction 3, while the axes of rotation of the wheels 8 and 9 define the transverse direction 7 perpendicular to the longitudinal direction 3.

FIG. 2 shows a staggered arrangement of the transverse bars 11 along the longitudinal direction 3 with respect to the belts 10, while FIG. 3 schematically shows the screw coupling 17 between a belt 10 and a bar 11.

In particular, the bar 11 comprises a section bar 12 provided with a cavity 13 inside which a plate 14 is inserted. A counter plate 15, or outer plate, is provided on the opposite side of the belt 10 in correspondence to this plate 14.

The plates 14 and 15, the section bar 12 and the belt 10 have respective holes 16 that, when aligned, can accept the screw 17 for clamping the structure in a pack.

FIG. 4 shows the belt 10 in one embodiment of the disclosure with a particular distribution of weft and warp fibers arranged in three superimposed layers where at least one of these fibers is made of aramid. In this example, the belt 10 comprises a multi-layer textile structure embedded in vulcanized rubber 21. The multi-layer textile structure comprises an inner layer 18 and two outer layers 19 and 20, respectively arranged on opposite sides with respect to the inner layer 18. The transverse bar 11 is fastened externally to one 19 of the two outer layers, while the remaining outer layer 20 faces the inside of the belt loop.

Each layer comprises a fabric warp fiber oriented along the longitudinal direction 3 and two fabric weft fibers arranged on opposite sides of the fabric warp fiber along the transverse direction 7.

According to the example shown, the fabric warp fiber 22 of the inner layer 18 is at least in part made of aramid. The fabric weft fibers 25 and 27 of the outer layers 19 and 20 are also at least in part made of aramid. The fabric weft fibers 23 of the inner layer 18 are at least in part made of nylon, while the fabric warp fibers 24 and 26 of the outer layers 19 and 20 are at least in part made of polyester.

It should be appreciated that, as previously mentioned, for the purposes of the present disclosure, even only one of the above-stated layers 18, 19 and 20 may comprise fibers at least in part made of aramid, their orientation can be angled with respect to the longitudinal direction 3, and the multi-layer structure can also comprise further outer layers or sub-layers between the specified outer layers 19 and 20 and inner layer 18.

Finally, FIG. 4 shows the optional presence of a linking yarn 28, which has the purpose of keeping the fabric weft and warp fibers of the layers in position, as well as creating a connection between different layers.

It is evident that modifications and variants can be made with regard to the belt for tracked vehicles described herein without departing from the scope of the appended claims. As such, the present disclosure also covers embodiments not described in the detailed description and equivalent embodiments that fall within scope of the appended claims. Accordingly, various changes and modifications to the presently disclosed embodiments will be apparent to those skilled in the art. Such changes and modifications can be made without departing from the spirit and scope of the present subject matter and without diminishing its intended technical scope. It is therefore intended that such changes and modifications be covered by the appended claims.

The invention is claimed as follows:

1. A tracked vehicle belt configured to be driven in a closed loop between a front wheel and a rear wheel of a vehicle along a longitudinal direction and configured to support a plurality of transverse bars, the tracked vehicle belt comprising:
 a fabric multi-layer internal structure embedded in vulcanized rubber, wherein:
  the fabric multi-layer internal structure comprises at least three layers comprising an inner layer and two outer layers on opposite sides of the inner layer, each of the layers comprising a fabric weft fiber, and a fabric warp fiber,
  a linking yarn keeps the fabric weft fibers and the fabric warp fibers of the layers in position and creates a connection between the different layers, and
  at least a portion of a fabric fiber of at least one of the at least three layers of the fabric multi-layer internal structure comprises an aramid fiber.

2. The tracked vehicle belt of claim 1, wherein the fabric warp fiber of at least one of the three layers is aligned to the longitudinal direction and the fabric weft fiber of that layer is aligned to a transverse direction perpendicular to the longitudinal direction.

3. The tracked vehicle belt of claim 2, wherein the fabric warp fiber of the inner layer at least partially comprises the aramid fiber.

4. The tracked vehicle belt of claim 3, wherein the fabric weft fiber of the inner layer at least partially comprises a nylon fiber.

5. The tracked vehicle belt of claim 2, wherein the fabric weft fiber of at least one of the outer layers at least partially comprises the aramid fiber.

6. The tracked vehicle belt of claim 5, wherein the fabric warp fiber of that outer layer at least partially comprises a polyester fiber.

7. The tracked vehicle belt of claim 1, wherein the fabric weft fiber of at least one of the outer layers is arranged on opposite sides with respect to the fabric warp fiber of that outer layer.

8. The tracked vehicle belt of claim 1, wherein for at least one of the layers, the fabric weft fiber is arranged on opposite sides with respect to the fabric warp fiber.

9. The tracked vehicle belt of claim 1, wherein the belt defines at least one hole and the aramid fiber is arranged adjacent to the at least one defined hole.

10. The tracked vehicle belt of claim 1, wherein the fabric fiber comprising the aramid fiber comprises a percentage of aramid of between 50% and 100%.

\* \* \* \* \*